US012808601B2

(12) United States Patent
Valentin et al.

(10) Patent No.: US 12,808,601 B2
(45) Date of Patent: Nov. 24, 2026

(54) FACILITY FOR PRODUCING LIQUID $CO_2$ AND BIOMETHANE WITH A MEANS FOR PREVENTING THE BUILD-UP OF HYDROGEN AND OXYGEN

(71) Applicant: L'Air Liquide, Société Anonyme pour l'Etude et l'Exploitation des Procédés Georges Claude, Paris (FR)

(72) Inventors: Solène Valentin, Voreppe (FR); François Barraud, Shanghai (CN); Golo Zick, Fontain (FR); Véronique Grabie, Coublevie (FR)

(73) Assignee: L'Air Liquide, Societé Anonyme pour l'Etude et l'Exploitation des Procédés Georges Clause, Paris (FR)

(*) Notice: Subject to any disclaimer, the term of this patent is extended or adjusted under 35 U.S.C. 154(b) by 119 days.

(21) Appl. No.: 18/717,230

(22) PCT Filed: Dec. 6, 2022

(86) PCT No.: PCT/EP2022/084637
§ 371 (c)(1),
(2) Date: Jun. 6, 2024

(87) PCT Pub. No.: WO2023/104815
PCT Pub. Date: Jun. 15, 2023

(65) Prior Publication Data

US 2025/0035376 A1 Jan. 30, 2025

(30) Foreign Application Priority Data

Dec. 8, 2021 (FR) ....................................... 2113158

(51) Int. Cl.
*F25J 3/02* (2006.01)
*B01D 53/047* (2006.01)
*B01D 53/22* (2006.01)

(52) U.S. Cl.
CPC .......... *F25J 3/0209* (2013.01); *B01D 53/047* (2013.01); *B01D 53/228* (2013.01);
(Continued)

(58) Field of Classification Search
None
See application file for complete search history.

(56) References Cited

U.S. PATENT DOCUMENTS 4,639,257 A * 1/1987 Duckett ................. F25J 3/0219 62/928
5,642,630 A 7/1997 Abdelmalek et al.
(Continued)

FOREIGN PATENT DOCUMENTS

AT 513644 B1 * 9/2014 ............. B01D 61/36
EP 3369473 A1 * 9/2018 ............. C07C 7/005
(Continued)

OTHER PUBLICATIONS

International Search Report for corresponding PCT/EP2022/084637, Mar. 15, 2023.

*Primary Examiner* — Jenna M Maroney
(74) *Attorney, Agent, or Firm* — Yan Jiang

(57) ABSTRACT

A facility for the production of liquid $CO_2$ and biomethane, from a biogas production unit, comprises at least one biogas membrane separation unit configured to produce biomethane and a gas mixture M1 predominantly comprising carbon dioxide; a cryogenic distillation system configured to cryogenically distill the gas mixture M1 to thereby produce a liquid $CO_2$ and a gas mixture M2 comprising carbon dioxide, methane, oxygen and hydrogen; one or more membranes configured to receive a flow of the gas mixture M2 and separate the methane from the oxygen and hydrogen in the gas mixture M2; a conduit configured to recycle the methane resulting from the gas mixture M2 to the at least one biogas membrane separation unit; and a vent configured
(Continued)

to discharge of the oxygen and hydrogen resulting from the gas mixture M2.

14 Claims, 2 Drawing Sheets

(52) U.S. Cl.
CPC .......... *B01D 53/229* (2013.01); *F25J 3/0233* (2013.01); *F25J 3/0266* (2013.01); *B01D 2256/245* (2013.01); *B01D 2257/104* (2013.01); *B01D 2257/108* (2013.01); *B01D 2257/708* (2013.01); *B01D 2311/2669* (2013.01); *F25J 2205/40* (2013.01); *F25J 2205/80* (2013.01); *F25J 2210/66* (2013.01); *F25J 2220/82* (2013.01)

(56) References Cited

U.S. PATENT DOCUMENTS

| | | | | |
|---|---|---|---|---|
| 6,082,133 | A * | 7/2000 | Barclay | F25J 3/061<br>62/619 |
| 6,168,649 | B1 * | 1/2001 | Jensvold | B01D 71/48<br>95/47 |
| 9,969,949 | B1 * | 5/2018 | Foody | C12M 47/18 |
| 11,471,823 | B2 * | 10/2022 | Roodbeen | B01D 53/227 |
| 12,305,137 | B2 * | 5/2025 | Karlsson | C10L 3/101 |
| 2016/0090910 | A1 * | 3/2016 | Ploeger | F23R 3/36<br>60/39.465 |
| 2016/0229771 | A1 * | 8/2016 | Paget | B01D 53/226 |
| 2018/0250627 | A1 * | 9/2018 | Zick | B01D 53/226 |
| 2019/0001263 | A1 | 1/2019 | Prince et al. | |
| 2020/0096254 | A1 * | 3/2020 | Cardon | C10L 3/103 |
| 2021/0086129 | A1 | 3/2021 | Terrien et al. | |
| 2021/0094894 | A1 | 4/2021 | Whitmore | |
| 2024/0352366 | A1 * | 10/2024 | Loeb | C10L 3/08 |

FOREIGN PATENT DOCUMENTS

| | | | | |
|---|---|---|---|---|
| EP | 4394293 | A1 * | 7/2024 | B01D 53/002 |
| FR | 3025117 | A1 * | 3/2016 | C10L 3/104 |
| FR | 3030026 | B1 * | 9/2019 | F25J 3/0209 |
| KR | 10 1327337 | | 11/2013 | |
| KR | 10 1327338 | | 11/2013 | |
| KR | 2016 0055653 | | 5/2016 | |
| WO | WO-2015036709 | A1 * | 3/2015 | C07C 7/144 |
| WO | WO 2017 109305 | | 6/2017 | |
| WO | WO 2019 122661 | | 6/2019 | |
| WO | WO-2021032315 | A1 * | 2/2021 | C01B 23/0052 |
| WO | WO-2024099862 | A1 * | 5/2024 | F25J 1/0022 |
| WO | WO-2024141663 | A1 * | 7/2024 | F25J 3/0266 |
| WO | WO-2025132650 | A1 * | 6/2025 | F25J 3/0233 |

* cited by examiner

FACILITY FOR PRODUCING LIQUID $CO_2$ AND BIOMETHANE WITH A MEANS FOR PREVENTING THE BUILD-UP OF HYDROGEN AND OXYGEN

CROSS REFERENCE TO RELATED APPLICATIONS

This application is a 371 of International Application No. PCT/EP2022/084637, filed Dec. 6, 2022, which claims priority to French Patent Application No. 2113158, filed Dec. 8, 2021, the entire contents of which are incorporated herein by reference.

BACKGROUND

The present invention relates to a facility and to a process for the production of liquid $CO_2$ and biomethane from a biogas stream.

Biogas is the gas produced during the degradation of organic matter in the absence of oxygen (anaerobic fermentation), also known as methanization. It can be a natural degradation—it is thus observed in marshes or household waste landfills—but the production of biogas can also result from the methanization of waste in a dedicated reactor, the conditions of which are controlled, known as a methanizer or digester, then in a post-digester, which is similar to the digester and which makes it possible to push the methanization reaction further.

Biomass will refer to any group of organic matter which can be converted into energy through this methanization process, e.g. treatment plant sludge, manure/liquid manure, agricultural residues, food waste, and the like.

The digester, that is to say the reactor dedicated to the methanization of biomass, is a closed vessel which is or is not heated (operation at a set temperature, between ambient temperature and 55° C.) and the contents of which, constituted by biomass, are stirred, continuously or sequentially. The conditions in the digester are anaerobic and the generated biogas ends up in the headspace of the digester (gas headspace), where it is withdrawn. Post-digesters are similar to digesters.

By virtue of its main constituents—methane and carbon dioxide—biogas is a powerful greenhouse gas; at the same time, it also constitutes a source of renewable energy which is appreciable in the context of the increasing scarcity of fossil fuels.

Biogas contains predominantly methane ($CH_4$) and carbon dioxide ($CO_2$), in proportions which can vary according to the way in which the biogas is obtained and to the substrate, but can also contain, in smaller proportions, water, nitrogen, hydrogen sulfide ($H_2S$) or oxygen, and also other organic compounds, in the form of traces, including $H_2S$, between 10 and 50,000 ppmv.

Depending on the organic matter that are being decomposed and on the implemented techniques, the proportions of the components differ but, on average, biogas comprises, on a dry gas basis, from 30% to 75% of methane, from 15% to 60% of $CO_2$, from 0% to 15% of nitrogen, from 0% to 5% of oxygen and trace compounds.

Value can be obtained from biogas in various ways. Biogas can, after a slight treatment, be used close to the production site to provide heat, electricity or a mixture of the two (cogeneration); the high content of carbon dioxide reduces its calorific power, increases the costs of compression and of transportation, and limits the economic advantage of such nearby use.

More advanced purification of biogas allows it to be more widely used, in particular, advanced purification of biogas makes it possible to obtain a biogas which has been purified to the specifications of natural gas and which can be used as a substitute for the latter; biogas thus purified is known as "biomethane". Biomethane thus supplements natural gas resources with a renewable part produced within territories; it can be used for exactly the same uses as natural gas of fossil origin. It can feed a natural gas network or a vehicle filling station; it can also be liquefied to be stored in the form of liquid natural gas (bioLNG), and the like.

On the other hand, biogas also consists largely of carbon dioxide, for which value can be obtained for diverse and varied markets such as carbonated drinks, greenhouses and cleaning. This carbon dioxide needs to be liquefied in order to be transported to its use. This liquefaction also makes it possible to achieve the required quality of the gas. The remainder of the gaseous compounds is laden with methane and is recycled to the biogas purification process.

This recycled gas predominantly contains carbon dioxide, at between 45% and 75%, methane, at between 25% and 55%, nitrogen, oxygen and hydrogen, if present in the biogas. Oxygen and hydrogen will tend to accumulate between the biogas purification process and the $CO_2$ liquefaction process until explosive compositions are reached.

This is because hydrogen is a very small molecule which permeates through the membranes and thus ends up in the vents of the purification unit which are directed to the $CO_2$ liquefaction unit.

Hydrogen is a noncondensable, which will be completely recycled to the purifier after treatment of the vents by the liquefier. If hydrogen is recycled indefinitely between the two units, its concentration will be increased over time and may reach a level resulting in a risk of explosion.

Oxygen permeates in part through the membranes and thus ends up, in part, in the vent. Oxygen is also a noncondensable, which will end up in the recycle to the purifier. A high concentration of oxygen in the gas that returns to the purifier presents a risk of explosion.

Hence, a problem is to provide a liquid $CO_2$ and biomethane production facility comprising a means of preventing the build-up of hydrogen and oxygen in the recycle.

SUMMARY

A solution of the present invention is a liquid $CO_2$ and biomethane production facility, comprising:

- a biogas production unit,
- at least one biogas membrane separation unit which makes it possible to produce biomethane and a gas mixture M1 predominantly comprising carbon dioxide,
- a unit for cryogenic distillation of the gas mixture M1 which makes it possible to produce liquid $CO_2$ and a gas mixture M2 comprising carbon dioxide, methane, oxygen and hydrogen,
- one or more membranes located on the flow of the gas mixture M2 and making it possible to separate the methane from the oxygen-hydrogen mixture included in the gas mixture M2,
- a means of recycling the methane resulting from the gas mixture M2 to the membrane separation unit, and
- a vent which makes possible the discharge of the oxygen-hydrogen mixture separated from the gas mixture M2.

An example of a facility according to the invention is represented in [FIG. 1]. As the case may be, the facility according to the invention can exhibit one or more of the characteristics below:

the facility comprises, between the biogas production unit and the membrane separation unit, a biogas compression means;

the compression means is a lubricated screw compressor;

the facility comprises, between the biogas production unit and the membrane separation unit, a unit which makes it possible to remove, at least in part, hydrogen sulfide and volatile organic compounds;

the unit which makes it possible to remove, at least in part, hydrogen sulfide and volatile organic compounds is a pressure swing adsorption unit;

the membrane(s) located on the flow of gas mixture M2 is(are) more permeable to oxygen and to hydrogen than to methane;

the membrane separation unit comprises three or four membrane stages;

the membrane separation unit comprises:

a first membrane separation stage equipped with a first membrane capable of receiving the biogas stream and of providing a first permeate and a first retentate, said first membrane being more permeable to carbon dioxide than to methane, a second membrane separation stage equipped with a second membrane capable of receiving a second feed gas and of providing a second permeate and a second retentate, said second membrane being more permeable to carbon dioxide than to methane, and said second membrane separation stage being connected in series with the first membrane separation stage so that the first retentate constitutes the second feed gas, a third membrane separation stage equipped with a third membrane capable of receiving a third feed gas and of providing a third permeate and a third retentate, said third membrane being more permeable to carbon dioxide than to methane, and said third membrane separation stage being connected in series with the first membrane separation stage so that the first permeate constitutes the third feed gas.

the membrane separation unit can comprise a fourth membrane separation stage equipped with a fourth membrane capable of receiving a feed gas and of providing a permeate and a retentate, said fourth membrane being more permeable to carbon dioxide than to methane, and said fourth membrane separation stage being connected in series with the third membrane separation stage so that the third retentate constitutes the fourth feed gas.

Another subject matter of the present invention is a process for the production of liquid $CO_2$ and methane, using the facility according to the invention and comprising:

a) a biogas production step, b) a first step of membrane separation of biogas, so as to produce biomethane and a gas mixture M1 predominantly comprising carbon dioxide, c) a step of cryogenic distillation of the gas mixture M1, so as to produce liquid $CO_2$ and a gas mixture M2 comprising carbon dioxide, methane, oxygen and hydrogen, d) a second step of membrane separation of the gas mixture M2, so as to separate the methane from the oxygen-hydrogen mixture included in the gas mixture M2.

e) a step of recycling the methane resulting from the gas mixture M2 to the membrane separation unit, and f) a step of discharge of the oxygen-hydrogen mixture resulting from the gas mixture M2.

As the case may be, the process according to the invention can have one or more of the characteristics below:

the process comprises, between steps a) and b), a biogas compression step;

the process comprises, between steps a) and b), a prepurification step which makes it possible to remove, at least in part, hydrogen sulfide and volatile organic compounds;

the prepurification step is a step of purification by adsorption;

step f) is carried out continuously.

The solution according to the invention provides for the use of one or more membranes to continuously vent a flow of this recycle gas from the $CO_2$ liquefier to the biogas purifier. The membrane(s) used preferentially separate oxygen and hydrogen from methane and carbon dioxide.

The membrane is a multitude of micrometric tubes, called fibers, made of a porous material through which gas compounds may pass. The separation of the various gas compounds through a membrane takes place by difference in pressure between the flow inside the membrane fibers and the flow outside the membrane fibers and by difference in affinity of the gas compounds with the membrane fiber. The gas stream which passes through the pores of the membrane fiber is referred to as permeate. The gas stream which does not pass through the pores of the membrane fiber is referred to as retentate.

Hydrogen and oxygen diluted in carbon dioxide end up in the membrane permeate, while methane diluted in carbon dioxide ends up in the membrane retentate.

The retentate from the membrane is recycled to the biogas purifier, while the permeate from the membrane is vented off.

BRIEF DESCRIPTION OF THE DRAWINGS

For a further understanding of the nature and objects for the present invention, reference should be made to the following detailed description taken in conjunction with the accompanying drawings in which like elements are given the same or analogous reference numbers and wherein.

DETAILED DESCRIPTION OF PREFERRED EMBODIMENTS

Figure 1A:
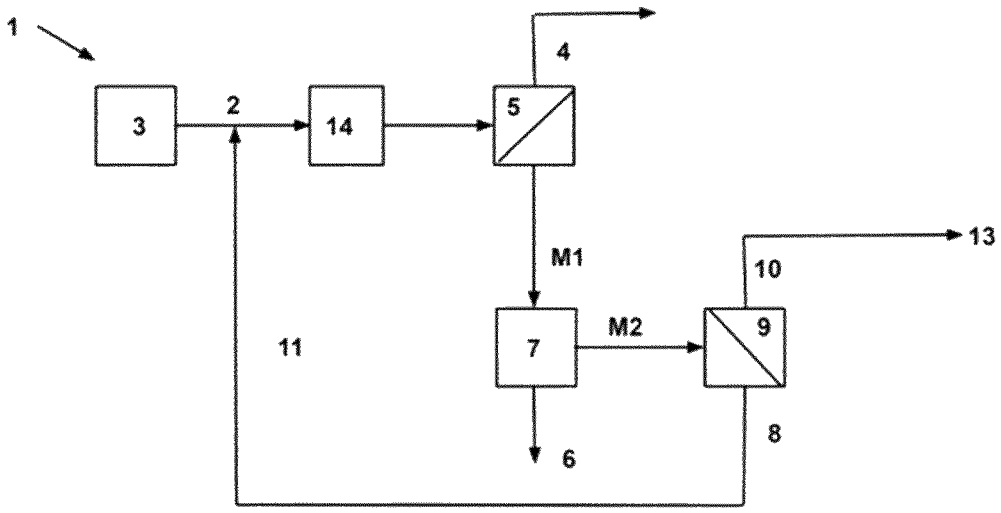
FIG. 1*a* illustrates a block flow diagram of an exemplary biogas processing facility.
Figure 1B:
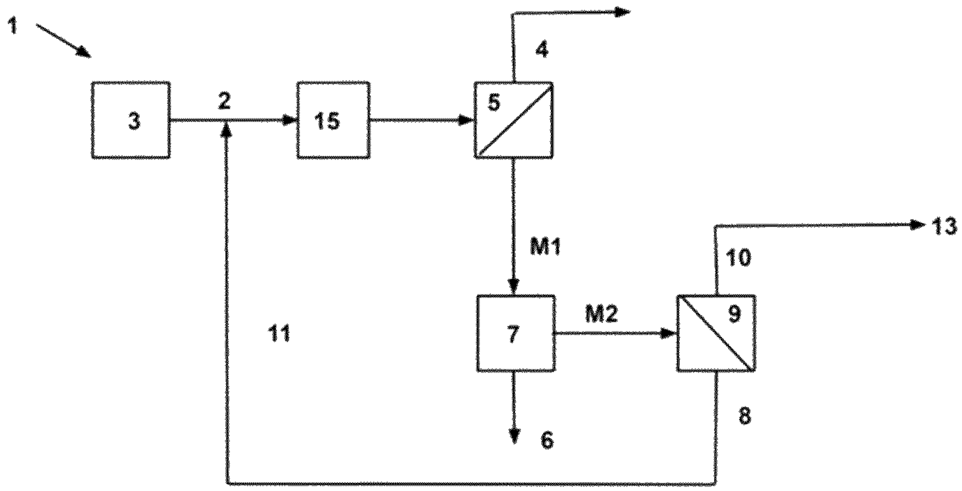
FIG. 1*b* illustrates a block flow diagram of another exemplary biogas processing facility.
Figure 2:
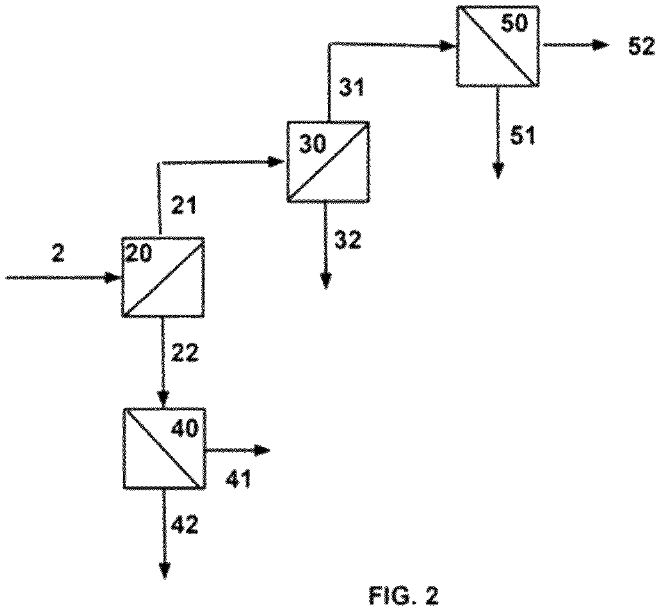
FIG. 2 illustrates a diagram of a first membrane (20), a second membrane (30) a third membrane (40), and a fourth membrane (50).

The present invention will be described in greater detail with the help of the example below.

The biogas contains 100 ppm of hydrogen and 0.2% of oxygen. Hydrogen must be completely purged through the membrane.

This solution, which impacts the biomethane yield, is necessary to ensure the safety of the facility. It is illustrated in this table, which is given as an example. This table takes the example of treatment of a maximum biogas flow rate (1100 $Nm^3/h$ of wet crude biogas) having a nominal composition.

| | Biogas | $LCO_2$ | Biomethane | Purge |
|---|---|---|---|---|
| Dry flow rate | 1043 $Nm^3/h$ | 374 $Nm^3/h$ | 667 $Nm^3/h$ | 1.7 $Nm^3/h$ |
| $N_2$ | 0.4% | 0.0% | 0.7% | 0.6% |
| $O_2$ | 0.2% | 0.0% | 0.3% | 8.3% |
| Methane | 62.4% | 0.0% | 97.5% | 8.0% |
| $CO_2$ | 37.0% | 100.0% | 1.6% | 76.7% |
| $H_2$ | 0.01% | 0.0% | 0.0% | 6.4% |
| Bio$CH_4$ yield | | | 99.98% | |

In other words, the solution according to the invention makes it possible not only to ensure the safety of the operation, by removing the compounds responsible for risks of explosion, but also to increase the methane yield.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A facility (1) for the production of liquid $CO_2$ (6) and biomethane (4), from a biogas (2) production unit (3), the facility comprising:

at least one biogas membrane separation unit (5) configured to produce biomethane (4) and a gas mixture M1 predominantly comprising carbon dioxide, a cryogenic distillation system (7) configured to cryogenically distill the gas mixture M1 to thereby produce a liquid $CO_2$ (6) and a gas mixture M2 comprising carbon dioxide, methane, oxygen and hydrogen, one or more membranes (9) configured to receive a flow of the gas mixture M2 and separate the methane (8) from the oxygen and hydrogen (10) in the gas mixture M2, a conduit (11) configured to recycle the methane (8) resulting from the gas mixture M2 to the at least one biogas membrane separation unit (5), and a vent (13) configured to discharge of the oxygen and hydrogen (10) resulting from the gas mixture M2.

2. The facility as claimed in claim 1, further comprising, between the biogas production unit (3) and the at least one biogas membrane separation unit (5), a compressor (14) configured to compress the biogas (2).

3. The facility as claimed in claim 2, characterized in that the compressor (14) is a lubricated screw compressor.

4. The facility of claim 1, further comprising, between the biogas production unit (3) and the at least one biogas membrane separation unit (5), a purification system (15) configured to remove, at least in part, hydrogen sulfide and volatile organic compounds from the biogas (2).

5. The facility as claimed in claim 4, characterized in that the purification system (15) is a pressure swing adsorption unit.

6. The facility of claim 1, characterized in that the one or more membranes (9) are more permeable to oxygen and to hydrogen than to methane.

7. The facility of claim 1, characterized in that the at least one biogas membrane separation unit (5) comprises three or four membrane stages.

8. The facility as claimed in claim 7, characterized in that the at least one biogas membrane separation unit (5) comprises:

a first membrane separation stage equipped with a first membrane (20) capable of receiving the biogas (2) stream and of providing a first permeate (22) and a first retentate (21), said first membrane being more permeable to carbon dioxide than to methane, a second membrane separation stage equipped with a second membrane (30) capable of receiving a second feed gas and of providing a second permeate (32) and a second retentate (31), said second membrane (30) being more permeable to carbon dioxide than to methane, and said second membrane separation stage being connected in series with the first membrane separation stage so that the first retentate (21) constitutes the second feed gas, a third membrane separation stage equipped with a third membrane (40) capable of receiving a third feed gas and of providing a third permeate (42) and a third retentate (41), said third membrane being more permeable to carbon dioxide than to methane, and said third membrane separation stage being connected in series with the first membrane separation stage so that the first permeate (22) constitutes the third feed gas.

9. The facility as claimed in claim 8, characterized in that the at least one biogas membrane separation unit (5) further comprises a fourth membrane separation stage equipped with a fourth membrane (50) capable of receiving a feed gas and of providing a permeate (52) and a retentate (51), said fourth membrane being more permeable to carbon dioxide than to methane, and said fourth membrane separation stage being connected in series with the third membrane separation stage so that the third retentate (31) constitutes the fourth feed gas.

10. A process for the production of liquid $CO_2$ and methane comprising:

a) a first step of membrane separation of biogas, to produce biomethane (4) and a gas mixture M1 predominantly comprising carbon dioxide, b) a step of cryogenic distillation of the gas mixture M1, to produce liquid $CO_2$ (6) and a gas mixture M2 comprising carbon dioxide, methane, oxygen and hydrogen, c) a second step of membrane separation of the gas mixture M2, to separate the methane (8) from the oxygen and hydrogen (10) included in the gas mixture M2, d) a step of recycling the methane (8) resulting from the gas mixture M2 to the feed gas for the first step of membrane separation of biogas, and e) a step of discharging of the oxygen and hydrogen (10) resulting from the gas mixture M2.

11. The process as claimed in claim 10, further comprising a biogas compression step (14) prior to the first step of membrane separation of biogas.

12. The process of claim 10 further comprising a prepurification step (15) to remove, at least in part, hydrogen sulfide and volatile organic compounds from the biogas (2) prior to the first step of membrane separation of biogas.

13. The process as claimed in claim 12, characterized in that the prepurification step (15) is a step of purification by adsorption.

14. The process of claim 10, characterized in that step e) is carried out continuously.

* * * * *